(12) United States Patent
     Smid et al.

(10) Patent No.: US 10,906,554 B2
(45) Date of Patent: Feb. 2, 2021

(54) AUTONOMOUS DRIVING SYSTEM

(71) Applicant: MAGNA ELECTRONICS INC., Auburn Hills, MI (US)

(72) Inventors: G. Edzko Smid, Oxford, MI (US); John Fiaschetti, Rochester Hills, MI (US); Ronald R. Renaud, Oxford, MI (US); Alan Cordeiro, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 301 days.

(21) Appl. No.: 15/987,313

(22) Filed: May 23, 2018

(65) Prior Publication Data
     US 2018/0339714 A1    Nov. 29, 2018

Related U.S. Application Data

(60) Provisional application No. 62/509,913, filed on May 23, 2017.

(51) Int. Cl.
    *B60W 50/14* (2020.01)
    *G05D 1/00* (2006.01)
    *G08G 1/0967* (2006.01)
    *G08G 1/0968* (2006.01)
    *G06K 9/00* (2006.01)
    *B60W 50/00* (2006.01)
    *B60W 60/00* (2020.01)

(52) U.S. Cl.
    CPC ........ *B60W 50/14* (2013.01); *B60W 50/0097* (2013.01); *B60W 60/0051* (2020.02); *B60W 60/0053* (2020.02); *G05D 1/0088* (2013.01); *G06K 9/00845* (2013.01); *G08G 1/0967* (2013.01); *G08G 1/0968* (2013.01); *B60W 2050/0072* (2013.01); *B60W 2050/146* (2013.01); *B60W 2552/00* (2020.02); *B60W 2556/50* (2020.02); *G05D 2201/0213* (2013.01)

(58) Field of Classification Search
    CPC .................... B60W 2050/0072; B60W 50/14
    See application file for complete search history.

(56) References Cited

U.S. PATENT DOCUMENTS

| | | |
|---|---|---|
| 2,187,761 A | 1/1940 | Torrens |
| 2,199,060 A | 4/1940 | Young |

(Continued)

*Primary Examiner* — Ryan Rink
(74) *Attorney, Agent, or Firm* — Honigman LLP

(57) ABSTRACT

An autonomous vehicle driving system includes a control that autonomously controls the vehicle. The control, upon receipt of a destination geographical location, controls the vehicle to travel to the destination geographical location, and wirelessly receives data pertaining to driving conditions relevant to the route being traveled by the vehicle. Responsive to the received driving conditions data, the control determines a geographic location ahead of the vehicle along the route where driving of the vehicle by an occupant of the vehicle is desired. When the vehicle is traveling along the route and toward the determined geographic location and is within a threshold time and/or distance to the determined geographic location, the control informs the occupant of distance to and/or time of travel to the determined geographic location so the occupant is prepared to take over control of the vehicle and drive the vehicle upon the vehicle reaching the determined geographic location.

16 Claims, 2 Drawing Sheets

(56) References Cited

U.S. PATENT DOCUMENTS

| | | |
|---|---|---|
| 5,469,143 A | 11/1995 | Cooper |
| 5,689,241 A | 11/1997 | Clarke, Sr. et al. |
| 6,172,610 B1 | 1/2001 | Prus |
| 6,218,947 B1 | 4/2001 | Sutherland |
| 6,445,303 B1 | 9/2002 | Aryeh |
| 6,590,499 B1 | 7/2003 | D'Agosto |
| 7,038,577 B2 | 5/2006 | Pawlicki et al. |
| 7,532,964 B2 | 5/2009 | Fujita et al. |
| 7,720,580 B2 | 5/2010 | Higgins-Luthman |
| 7,855,755 B2 | 12/2010 | Weller et al. |
| 8,670,891 B1 * | 3/2014 | Szybalski .............. B62D 1/286 701/23 |
| 9,129,508 B2 | 9/2015 | Kuntzel |
| 9,500,489 B1 | 11/2016 | Ng |
| 10,324,463 B1 * | 6/2019 | Konrardy ............ B60W 50/082 |
| 10,337,872 B2 * | 7/2019 | Abe .................... B60W 30/143 |
| 10,421,465 B1 * | 9/2019 | Jutkowitz ............ B60W 50/16 |
| 10,589,713 B2 * | 3/2020 | Boran ................... B60W 50/14 |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0094899 A1 * | 4/2015 | Hackenberg ........ B60W 50/082 701/23 |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0229414 A1 * | 8/2016 | Desnoyer .......... B60W 50/0097 |
| 2017/0277182 A1 | 9/2017 | May et al. |
| 2017/0329331 A1 | 11/2017 | Gao |
| 2017/0329346 A1 | 11/2017 | Latotzki |
| 2017/0368936 A1 * | 12/2017 | Kojima ................ B60K 28/06 |
| 2018/0032072 A1 * | 2/2018 | Hoye .................... B60W 40/08 |
| 2018/0088574 A1 | 3/2018 | Latotzki et al. |
| 2018/0150074 A1 * | 5/2018 | Hashimoto ............ G05D 1/021 |
| 2018/0203455 A1 * | 7/2018 | Cronin .................. G01C 21/00 |
| 2018/0208211 A1 * | 7/2018 | Chiba ................ B60W 50/082 |
| 2018/0222490 A1 * | 8/2018 | Ishihara ................ B60N 2/002 |
| 2018/0272895 A1 * | 9/2018 | Schmidt .................... G05D 1/021 |
| 2018/0326994 A1 * | 11/2018 | Sakai .................... B60W 40/08 |
| 2018/0326999 A1 * | 11/2018 | Hershkovitz ...... G06K 9/00832 |
| 2018/0357496 A1 * | 12/2018 | Chiba .................... G01C 21/26 |
| 2019/0054928 A1 * | 2/2019 | Hatano ................ B60W 10/04 |
| 2019/0106108 A1 | 4/2019 | Wienecke et al. |
| 2019/0152479 A1 * | 5/2019 | Desmoineaux ........ G08G 1/207 |
| 2019/0250269 A1 | 8/2019 | Miu |
| 2019/0329774 A1 * | 10/2019 | Hilnbrand ........... B60W 60/005 |
| 2019/0332113 A1 * | 10/2019 | Mangal ............. G01C 21/3461 |
| 2020/0130676 A1 | 4/2020 | Smid |

\* cited by examiner

AUTONOMOUS DRIVING SYSTEM

CROSS REFERENCE TO RELATED APPLICATION

The present application claims the filing benefits of U.S. provisional application Ser. No. 62/509,913, filed May 23, 2017, which is hereby incorporated herein by reference in its entirety.

FIELD OF THE INVENTION

The present invention relates generally to a driving assist system for a vehicle and, more particularly, to a driving assist system that is capable of autonomous control of the vehicle.

BACKGROUND OF THE INVENTION

It is known to provide driver drowsiness alert systems in vehicles to alert the driver when the system determines that he or she is getting drowsy or falling asleep. Examples of such known systems are described in U.S. Pat. Nos. 2,187,761; 2,199,060; 5,469,143; 5,689,241; 6,172,610; 6,218,947; 6,445,303; 6,590,499; 7,532,964; 9,129,508 and/or 9,500,489, which are hereby incorporated herein by reference in the entireties.

SUMMARY OF THE INVENTION

The present invention provides a driving assistance system or autonomous control system for a vehicle that provides a method for the autonomous driving system to determine when the driver of the automated vehicle can take a nap (or otherwise be distracted or generally unavailable to immediately take over control of the vehicle) and for how long. The system can suggest to the driver when it would be a good time to take a nap, or per request when the next opportunity is available for a nap. The present invention addresses the desire for a driver or occupant in an autonomous vehicle to take a nap while the vehicle is in active autonomous mode. This system may aggregate information from the internet, road infrastructure, driver monitoring, and from a programmed navigation route, in order to determine when and for how long it would be suitable for the driver to take a nap, while the vehicle is following the programmed route autonomously.

These and other objects, advantages, purposes and features of the present invention will become apparent upon review of the following specification in conjunction with the drawings.

DESCRIPTION OF THE PREFERRED EMBODIMENTS

A vehicle vision system and/or driving assist system and/or object detection system operates to capture image data representative of a scene exterior of the vehicle and may process the captured image data to display images and to detect objects at or near the vehicle and in the predicted path of the vehicle, such as to assist a driver of the vehicle in maneuvering the vehicle in a rearward direction. The system includes an image processor or image processing system that is operable to receive image data from one or more cameras and provide an output to a display device for displaying images representative of the captured image data. The system provides autonomous control of the vehicle to drive the vehicle along a route or road without requiring the driver's input for at least a portion of the planned route. Optionally, the vision system may provide display, such as a rearview display or a top down or bird's eye or surround view display or the like.

Figure 1:
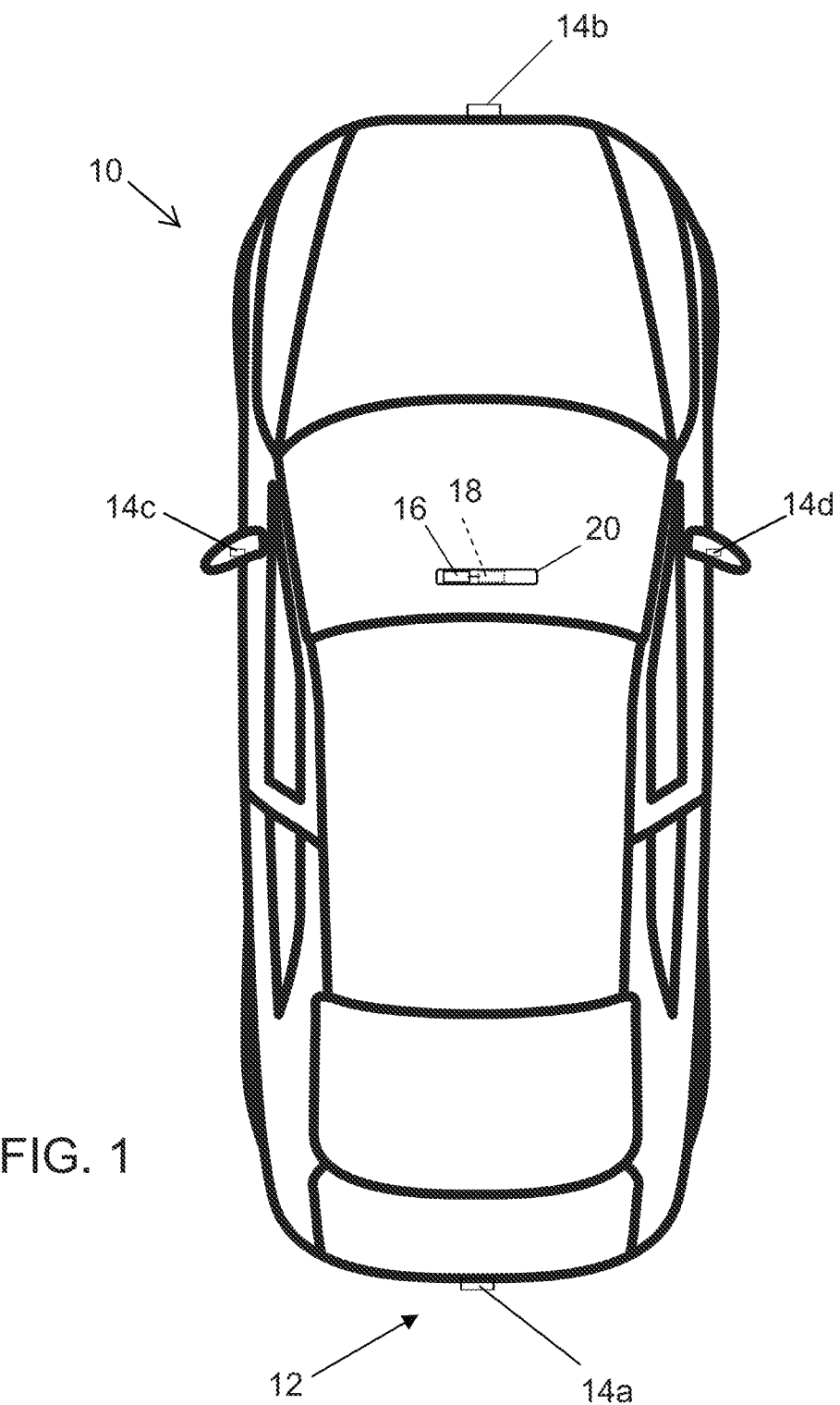
FIG. 1 is a plan view of a vehicle with a vision system that incorporates cameras in accordance with the present invention.

Referring now to the drawings and the illustrative embodiments depicted therein, a vehicle 10 includes a driving assist system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The driving assist system may also utilize multiple non-imaging sensors, such as radar, lidar and/or ultrasonic sensors. Thus, the control may autonomously or semi-autonomously control the vehicle responsive to processing of image data captured by the cameras and responsive to processing of sensor data captured by the non-imaging sensors.

Many technologies are presented to monitor the driver's state, alter level, or drowsiness level. And many technologies are proposed to wake up the driver, or keep the driver awake, or generate an alarm when the driver is dozing off.

The presently claimed invention provides autonomous control without scheduled interruption of the driver so as to allow the driver to plan for and to rest or take a nap while the system autonomously drives the vehicle along a selected or programmed route. When the vehicle is driving autonomously, and the driver would like to rest or take a nap, the driver can request from the system if he/she can take a nap. The system (via processing of data available that pertains to the selected or programmed route) is able to suggest that the driver has a certain window of time to take a nap (or otherwise not pay attention to the road or driving of the vehicle), before he/she is required to be alert again (to either be ready to take over control of the vehicle or to actually take over manual control of the vehicle). Similarly, the driver can configure the system to recommend when—and for how long—he/she will have an opportunity to take a nap, the system may alert the driver with a recommendation that, for example, the next 30 minutes would be a good time to nap.

Vehicles with Automated Driving capabilities (ADAS) typically will be equipped with a dedicated Control Module (ACM) to manage the automated driving features. Automated driving capabilities are categorized by NHTSA in 5 levels, where levels 4 and 5 allow the driver to be occupied with tasks other than operating the vehicle on the road. These systems must have the ability to monitor and alert the driver to return to the vehicle operation task when necessary. Levels 4 and 5 of automated driving include many other features that require the system to follow a programmed route to a destination.

The driving assist system of the present invention includes an ACM that is connected to the internet (Cloud), such as via cell phone or other communication media. By means of access to the internet, the system has the ability to acquire information or data about current local traffic conditions, weather conditions, road construction, and/or the like. By means of tracking the vehicle location on a map, the system can determine the anticipated driving activity. For example, driving on a remote freeway in Kansas is far less complex than driving on the peripheral highways of New York City or Los Angeles. Furthermore, by inferring traffic conditions from the time of day, and day of the week or day in the year, the system will be able to anticipate rush hour traffic, or holiday traffic, or the like.

All of these sources of information are interpreted and combined and processed by the system to determine the level of complexity of the driving task along the selected or programmed route, and as such can be formulated to determine the Chance of an Unintended Driver Interception (CUDI) for locations or segments along the route. This CUDI can be expressed as a number between 0 and 100 percent at any location on the current or planned or selected route. By analyzing the predicted CUDI along the current route from the current driving location, the system can predict how long it will be driving on the route with the CUDI below a specific value or threshold value. Based on such predictions, the system can determine if part of the route is acceptable for the driver to take a nap or is acceptable for the driver to attend to other tasks, but still be available to take over control of the vehicle if necessary. Optionally, for example, the CUDI can be used to reference one threshold for allowing the driver to attend to other tasks other than operating the vehicle or monitoring the drive for a period of time. And the CUDI can be used to reference another threshold for allowing the driver to take a nap for a certain time. Recovering to the task of actively operating a vehicle from a nap takes longer than recovering from a distracting task. Hence there are various thresholds for various activities.

By combining various sources of information, an autonomous vehicle can allow the driver of the vehicle to take a nap, or can recommend that the driver take a nap, while the vehicle follows the programmed route in autonomous driving mode. The driver will not have to pull over in to a parking lot to take a nap, but can allow the vehicle to continue on and along the route. Recommending the driver to take a nap well before entering a congested busy traffic scenario—such as a rush hour traffic in the vicinity of a big city—will increase driver alertness (when the driver is awakened refreshed before the vehicle enters the congested busy traffic scenario) and thus reduces risk on accidents due to driver fatigue.

Occupants of a vehicle are not able to attend to the driving situation promptly. Although this system allows a driver to take a nap during the lease risky driving scenarios, there is still always an increased risk of accidents when the vehicle encounters scenarios that require driver intervention.

The vehicle is able to operate autonomously by means of the Autonomous Vehicle Controller (AVC), and the driver will be able to do other things, and not pay attention to the road or to driving the vehicle. The system of the present invention allows the driver to take a nap (or otherwise not pay attention to the road or to driving the vehicle), and the system will monitor the driver and have the ability to wake up the driver when necessary.

Typically, a driver will only have the desire or need to take a nap on long trips. During long trips, the driver will typically enter a destination into the vehicle's navigation system. In the case of a programmed destination, the system will be able to predict traffic conditions based on the type of roads and vicinity of metropolitan areas. In addition, the AVC has the ability to connect to the internet and receive information about current traffic conditions on the road ahead (such as road construction, traffic accidents and/or the like). The internet can also provide information about special events, concerts, conventions, and other happenings that may affect traffic conditions in the route. Furthermore, based on the time of day, and the day of the week (or year), the system will be able to anticipate rush hour traffic or other more complex traffic conditions. For example, the system can indicate to the driver that there is an opportunity to take a nap in the next 45 minutes. The system can indicate that after 45 minutes, there will be 2 hours of busy traffic that may require the driver's attention. The system can indicate that after 2:45 hours there is a 3 hour window to take a nap.

The system may indicate to the driver that there is an opportunity to take a nap by means of an audible voice message, or by means of a gauge in the dashboard or on a multi-function screen or touch panel. The system can be configured to activate or turn on a "nap suggestion" when there is an available time gap, or only when the driver monitoring detects that the driver is sleepy (such as determined via a driver monitoring system or the like). When the system detects that the driver is starting to doze off, the system can suggest for example, that there is time for a 10 minute nap.

Optionally, the driver can request (by HMI function, or by voice request to the system) if he/she can take a nap or rest for 20 minutes. The driver may have to acknowledge that he/she is planning to take a nap (such as by actuating a user input to deactivate or override a driver monitoring system), so that the driver monitoring system is configured to allow driver to doze (otherwise, an alert may be generated by the driver monitoring system if it detects the driver starting to sleep or closing his/her eyes). The system may only allow the driver to nap when the vehicle is traveling in the right lane, and when the vehicle's set-speed is below a certain value. The system may limit some features, such as interstate passing or the like, when the driver is sleeping.

For example, the driver can indicate that he/she is going to sleep. The automated vehicle in its Active Autonomous Mode may then switch to a more conservative driving style. For example, the system may limit the maximum vehicle speed to 65 mph (depending on the speed limit), stay in the right lane, only pass when the vehicle in front is driving more than 'X' mph slower than our desired speed, and/or the like.

Optionally, the system may vary the set speed when the driver is taking a nap, to control the time that the vehicle can be autonomously driven before having to wake up the driver. For example, if the next city is 60 miles away, and it is likely that the driver has to be alert in that area, then the vehicle could slow down to 55 mph, in order to give the driver an hour of time to sleep before waking up, 5 minutes before the city. Or alternatively, if the driver wants to sleep only 40 minutes, then the system could drive at a set speed of, for example, about 70 mph.

Figure 2:
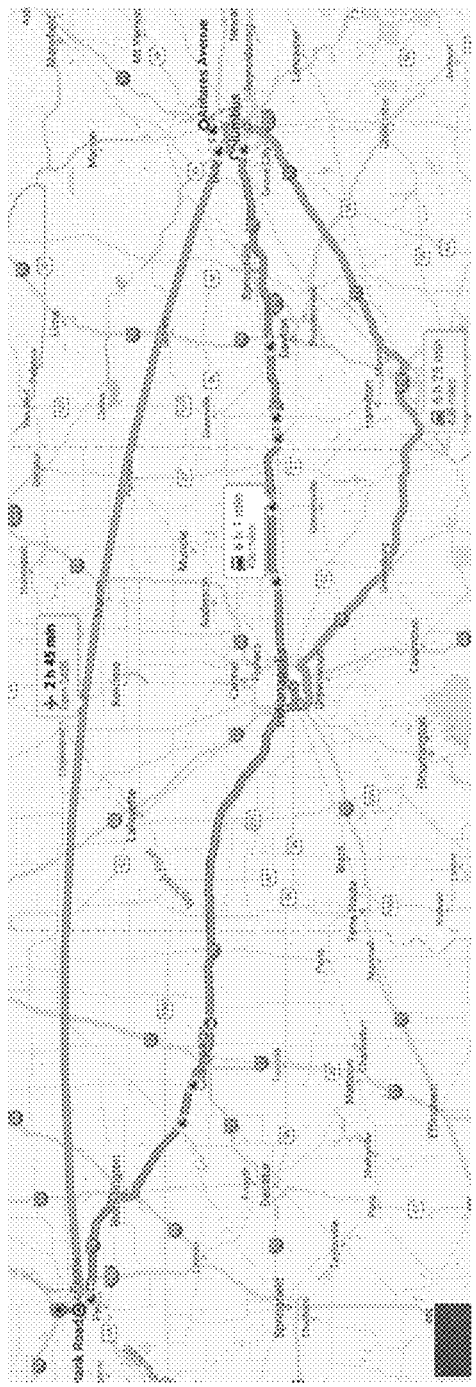
FIG. 2 is a map showing a selected route for a vehicle to be driven.
Figure 3:
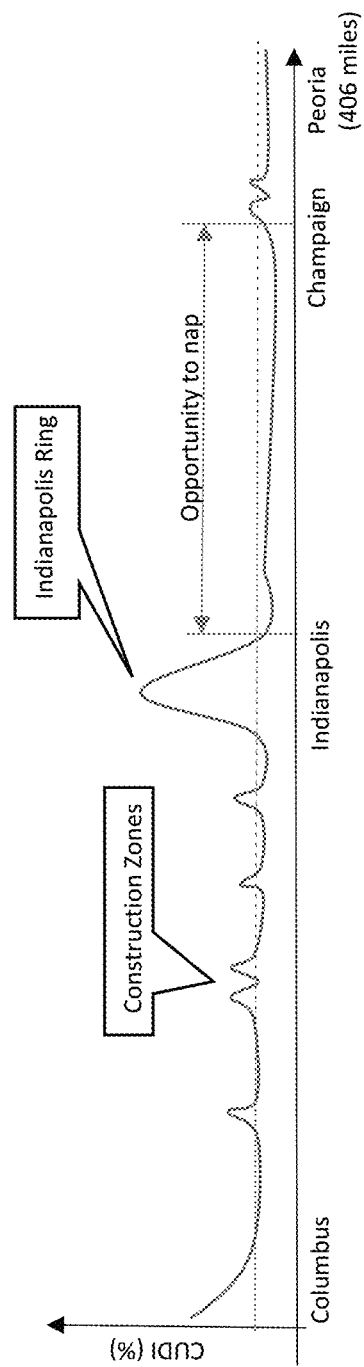
FIG. 3 is a graph showing a determined Chance of an Unintended Driver Interception (CUDI) for locations along the selected route, and showing where the CUDI is low enough to provide the driver of the vehicle an opportunity to take a nap.

As can be seen with reference to FIGS. 2 and 3, the driver can select a destination and the navigation system determines a route from the current vehicle location to the destination. The system of the present invention then processes data pertaining to the route (including proximity of cities, or other urban areas such as villages or towns or the like, along the route, local weather conditions forecast for areas along the route for the times when the vehicle will be at those areas, traffic conditions at areas along the route, predicted traffic conditions for the times when the vehicle will be at areas along the route, construction zones along the route, and/or the like) to determine the likelihood of a required driver intervention/control at multiple points or segments along the route. The system may then determine when the determined likelihood of driver intervention (CUDI) is below a threshold level (for example, below about 30 percent) for a threshold amount of time (for example, at least 10 minutes or at least 20 minutes or thereabouts, since it would not be as beneficial or suitable for a nap if the window is only 5 minutes), and may indicate to the driver when the vehicle will enter and drive along determined nap window or period. For example, and as shown in FIG. 3, the system determines that there is a segment of the route between Indianapolis and Champaign where the CUDI remains below the threshold level for an extended period of time, thus providing a window of opportunity for the driver to safely take a nap while the vehicle is driven autonomously. The system may generate an alert or indication when the vehicle is arriving at the start of the nap window, whereby the system may suspend the driver monitor/drowsiness detection system to allow the driver to close his/her eyes and take a nap. The system may generate a wake up alert (or simply unsuspend the driver monitor/drowsiness detection system) as the vehicle nears the end of the nap window, so that the driver is awakened and alert by the time the vehicle arrives at the end of the nap window.

Using the CUDI profile along the scheduled route and over the duration of the trip, the system can propose to the driver when would be the best times to take a nap, while the system is able to drive the vehicle in the autonomous mode. Optionally, the system can determine when would be the optimal time to depart on the trip, with consideration to the minimum overall CUDI. This could be computed as the lowest peak CUDI, such that the system has the best chance of autonomously navigating the complete trip, or the lowest average CUDI, such that the system may avoid rush hour and construction zones as much as possible. Optionally, the CUDI can be used to find alternative routes that have lower CUDI, meaning that the route may take more time, but is more suitable for autonomous driving, and therefore would allow an opportunity for the driver to take a nap.

Optionally, the system can determine a "sleep schedule" for an upcoming planned trip or programmed route. The driver will know ahead of time when it is time to sleep and when it is time to drive. This could also be optimized, such as by suggesting a route and time for departure, such that the driver may be able to take a nap during night time driving conditions, and may be required to be alert during the day only. For example, if a route is scheduled to drive through a busy metropolitan area at 1 AM, then the driver would most likely be required to be alert, and not be asleep. In such a case, the system could either suggest an alternative route, or suggest an alternative time for departure of the trip.

Therefore, the system of the present invention provides a system that can determine a likelihood or possibility of a driver having to take over the autonomously controlled vehicle at various locations along a planned or selected route or path of travel of the vehicle. The system may indicate to the driver that he or she may take a nap or may otherwise allow the driver to take a nap (such as by overriding a driver monitoring and drowsiness alert system of the vehicle) when the vehicle is at the regions or zones of the planned route where it is determined that the likelihood of having the driver take over control of the vehicle is below a threshold level. When the vehicle approaches the end of the determined nap zone, the system may awaken the driver (such as via a driver drowsiness alert system or the like) so the driver can wake up and get ready to take over control of the driving functions of the vehicle before the vehicle reaches the end of the determined nap zone.

Optionally, and desirably, the driver actively selects the sleep mode before the monitoring system permits the driver to fall asleep and rest. Optionally, however, the driver drowsiness monitoring system may permit the driver to remain asleep even in the event of an unintentional dozing off (even if the driver had not actively selected the "sleep mode" choice), if the unintentional dozing off occurs at a predetermined nap zone or region or zone that would have been determined to be a nap zone if the driver had requested the nap feature.

The system is also operable to determine, responsive to a route to a destination geographic location and responsive to driving conditions data relevant to the route being traveled by the equipped vehicle toward the destination geographical location, a geographic location ahead of the equipped vehicle along the route being traveled where driving of the equipped vehicle by an occupant of the equipped vehicle is desired (e.g., desired for safe driving through that location, and it could be absolutely required for safety). When the equipped vehicle is traveling along the route and toward the determined geographic location and is within a threshold time and/or distance to the determined geographic location, the control informs the occupant of distance to and/or time of travel to the determined geographic location so the occupant is prepared to take over control of the equipped vehicle and drive the equipped vehicle upon the equipped vehicle reaching the determined geographic location. Thus, the system provides advance alert or information pertaining to one or more regions or zones or geographic locations along a route being travelled by the vehicle where the occupant must be alert and ready to take over control of the vehicle (such as construction zones or where there is an accident or the like).

The system may receive data from a navigation system, whereby the control determines the route responsive at least in part to the data received from the navigation system. Optionally, the route to be traveled by the equipped vehicle may be established by the occupant of the vehicle. Optionally, the route to be traveled by the equipped vehicle may be established by the control of the vehicle. The vehicle may comprise an autonomous vehicle, such as a ride-share vehicle or robo-taxi or the like, but may also be equipped with controls for an occupant to use (such as a steering wheel and accelerator and brake controls or pedals or the like) when the occupant has to assume control of the vehicle.

The control may determine the geographic location ahead of the equipped vehicle along the route being traveled responsive at least in part to determination of at least one location along the route where a likelihood of required driving of the equipped vehicle by the occupant is greater than a threshold level. In other words, the control determines regions or locations where the driver should control the vehicle instead of the autonomous control, such as construction zones or accidents or the like, and alerts the occupant that the vehicle is approaching the determined location.

The control alerts the occupant as the vehicle approaches the determined location and is a threshold distance and/or time away from the determined location. The threshold distance and/or time to the determined geographic location at which the alert or notification is given may vary depending on the speed of the equipped vehicle as the equipped vehicle travels along the route and approaches the determined geographical location. For example, if the vehicle is traveling 35 mph, the alert or notification or information may be provided when the vehicle is a mile or two away from the determined location, but if the vehicle is traveling 75 mph, the alert or notification or information may be provided when the vehicle is several miles (e.g., five miles or more) away from the determined location, so that in all situations, the occupant has sufficient time to become alert (if previously resting) and to get in proper position and mindset to take over control of the vehicle by the time the vehicle arrives at the determined geographical location.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454;

7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may monitor the driver utilizing aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336876, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. An autonomous driving system for a vehicle, said autonomous driving system comprising:
    a control operable to autonomously control a vehicle equipped with said autonomous driving system;
    wherein said control, upon receipt of a destination geographical location, autonomously controls the equipped vehicle to travel to the destination geographical location;
    wherein, when traveling to the destination geographical location, said control wirelessly receives data pertaining to driving conditions relevant to a route being traveled by the equipped vehicle toward the destination geographical location;
    wherein, responsive to the received driving conditions data, said control determines a geographic location ahead of the equipped vehicle along the route being traveled where driving of the equipped vehicle by an occupant of the equipped vehicle is desired;
    wherein, when the equipped vehicle is traveling along the route and toward the determined geographic location and is within a threshold time and/or distance to the determined geographic location, said control informs the occupant of distance to and/or time of travel to the determined geographic location so the occupant is prepared to take over control of the equipped vehicle and drive the equipped vehicle upon the equipped vehicle reaching the determined geographic location;
    wherein said control determines a segment along the route where a likelihood of required driving of the equipped vehicle by the occupant is less than a threshold level, and wherein said control informs the occupant of distance to and/or time of travel to the determined segment so the occupant is aware of when the occupant can rest for a resting period while the equipped vehicle is autonomously controlled along that determined segment;
    wherein the occupant can select the determined segment to rest, and wherein, responsive to the occupant selecting to rest, said control provides autonomous control of the equipped vehicle to control the equipped vehicle along the route being traveled by the equipped vehicle; and
    wherein, responsive to the occupant selecting to rest as the equipped vehicle travels along the determined segment, said control suspends a driver monitoring system of the equipped vehicle for at least a portion of the determined segment.

2. The autonomous driving system of claim 1, wherein said control receives data from a navigation system, and wherein said control determines the route responsive at least in part to the data received from the navigation system.

3. The autonomous driving system of claim 1, wherein said control determines the geographic location ahead of the equipped vehicle along the route being traveled responsive at least in part to determination of at least one location along the route where a likelihood of required driving of the equipped vehicle by the occupant is greater than a threshold level.

4. The autonomous driving system of claim 1, wherein, responsive to determination that the equipped vehicle is approaching the end of the determined segment, said control unsuspends the driver monitoring system.

5. The autonomous driving system of claim 1, wherein said control adjusts the speed of the equipped vehicle along the route at the determined segment to adjust the time duration of the resting period.

6. The autonomous driving system of claim 5, wherein said control reduces the speed of the equipped vehicle along the route being traveled by the equipped vehicle at the determined segment to extend the time duration of the resting period.

7. The autonomous driving system of claim 1, wherein the data pertaining to driving conditions comprises (i) data pertaining to proximity of urban areas along the route being traveled by the equipped vehicle, (ii) data pertaining to local weather conditions forecast for areas along the route being traveled by the equipped vehicle for the times when the equipped vehicle will be at those areas, (iii) data pertaining to traffic conditions at areas along the route being traveled by the equipped vehicle, (iv) data pertaining to predicted traffic conditions for the times when the equipped vehicle will be at areas along the route being traveled by the equipped vehicle, and/or (v) data pertaining to construction zones along the route being traveled by the equipped vehicle.

8. The autonomous driving system of claim 1, wherein the route being traveled by the equipped vehicle is established by the occupant of the equipped vehicle.

9. The autonomous driving system of claim 1, wherein the route is defined by said control of the equipped vehicle.

10. The autonomous driving system of claim 1, wherein the equipped vehicle comprises a ride-share vehicle having multiple occupants therein, and wherein one of the occupants is in a position to control the equipped vehicle when the equipped vehicle is traveling along the route and approaching the determined geographic location.

11. The autonomous driving system of claim 1, wherein the equipped vehicle is equipped with a steering wheel and brake controls for the occupant to use to control the equipped vehicle.

12. The autonomous driving system of claim 1, wherein the threshold time and/or distance to the determined geographic location at which said control informs the occupant is dependent on the speed of the equipped vehicle as the equipped vehicle travels along the route and approaches the determined geographical location.

13. An autonomous driving system for a vehicle, said autonomous driving system comprising:

a control operable to autonomously control a vehicle equipped with said autonomous driving system;

wherein said control, upon receipt of a destination geographical location, autonomously controls the equipped vehicle to travel to the destination geographical location;

wherein, when traveling to the destination geographical location, said control wirelessly receives data pertaining to driving conditions relevant to a route being traveled by the equipped vehicle toward the destination geographical location;

wherein the data pertaining to driving conditions comprises (i) data pertaining to proximity of urban areas along the route being traveled by the equipped vehicle, (ii) data pertaining to local weather conditions forecast for areas along the route being traveled by the equipped vehicle for the times when the equipped vehicle will be at those areas, (iii) data pertaining to traffic conditions at areas along the route being traveled by the equipped vehicle, (iv) data pertaining to predicted traffic conditions for the times when the equipped vehicle will be at areas along the route being traveled by the equipped vehicle, and/or (v) data pertaining to construction zones along the route being traveled by the equipped vehicle;

wherein, responsive to the received driving conditions data, said control determines a geographic location ahead of the equipped vehicle along the route being traveled where driving of the equipped vehicle by an occupant of the equipped vehicle is desired;

wherein said control determines the geographic location ahead of the equipped vehicle along the route being traveled responsive at least in part to determination of at least one location along the route where a likelihood of required driving of the equipped vehicle by the occupant is greater than a threshold level;

wherein, when the equipped vehicle is traveling along the route and toward the determined geographic location and is within a threshold time and/or distance to the determined geographic location, said control informs the occupant of distance to and/or time of travel to the determined geographic location so the occupant is prepared to take over control of the equipped vehicle and drive the equipped vehicle upon the equipped vehicle reaching the determined geographic location;

wherein said control determines a segment along the route where a likelihood of required driving of the equipped vehicle by the occupant is less than a threshold level, and wherein said control informs the occupant of distance to and/or time of travel to the determined segment so the occupant is aware of when the occupant can rest for a resting period while the equipped vehicle is autonomously controlled along that determined segment;

wherein the occupant can select the determined segment to rest, and wherein, responsive to the occupant selecting to rest, said control provides autonomous control of the equipped vehicle to control the equipped vehicle along the route being traveled by the equipped vehicle; and wherein, responsive to the occupant selecting to rest as the equipped vehicle travels along the determined segment, said control suspends a driver monitoring system of the equipped vehicle for at least a portion of the determined segment, and wherein, responsive to determination that the equipped vehicle is approaching the end of the determined segment, said control unsuspends the driver monitoring system.

14. An autonomous driving system for a vehicle, said autonomous driving system comprising:

a control operable to autonomously control a vehicle equipped with said autonomous driving system;

wherein said control, upon receipt of a destination geographical location, autonomously controls the equipped vehicle to travel to the destination geographical location;

wherein, when traveling to the destination geographical location, said control wirelessly receives data pertaining to driving conditions relevant to a route being traveled by the equipped vehicle toward the destination geographical location;

wherein, responsive to the received driving conditions data, said control determines a geographic location ahead of the equipped vehicle along the route being traveled where driving of the equipped vehicle by an occupant of the equipped vehicle is desired;

wherein said control determines the geographic location ahead of the equipped vehicle along the route being traveled responsive at least in part to determination of at least one location along the route where a likelihood of required driving of the equipped vehicle by the occupant is greater than a threshold level;

wherein, when the equipped vehicle is traveling along the route and toward the determined geographic location and is within a threshold time and/or distance to the determined geographic location, said control informs the occupant of distance to and/or time of travel to the determined geographic location so the occupant is prepared to take over control of the equipped vehicle and drive the equipped vehicle upon the equipped vehicle reaching the determined geographic location;

wherein the route being traveled by the equipped vehicle is established (i) by the occupant of the equipped vehicle or (ii) by the control of the equipped vehicle;

wherein said control determines a segment along the route where a likelihood of required driving of the equipped vehicle by the occupant is less than a threshold level, and wherein said control informs the occupant of distance to and/or time of travel to the determined segment so the occupant is aware of when the occupant can rest for a resting period while the equipped vehicle is autonomously controlled along that determined segment;

wherein the occupant can select the determined segment to rest, and wherein, responsive to the occupant selecting to rest, said control provides autonomous control of the equipped vehicle to control the equipped vehicle along the route being traveled by the equipped vehicle; and wherein, responsive to the occupant selecting to rest as the equipped vehicle travels along the determined segment, said control suspends a driver monitoring system of the equipped vehicle for at least a portion of the determined segment, and wherein, responsive to determination that the equipped vehicle is approaching the end of the determined segment, said control unsuspends the driver monitoring system.

15. The autonomous driving system of claim 14, wherein the data pertaining to driving conditions comprises (i) data pertaining to proximity of urban areas along the route being traveled by the equipped vehicle, (ii) data pertaining to local weather conditions forecast for areas along the route being traveled by the equipped vehicle for the times when the equipped vehicle will be at those areas, (iii) data pertaining to traffic conditions at areas along the route being traveled by the equipped vehicle, (iv) data pertaining to predicted traffic conditions for the times when the equipped vehicle will be at areas along the route being traveled by the equipped vehicle, and/or (v) data pertaining to construction zones along the route being traveled by the equipped vehicle.

16. The autonomous driving system of claim 14, wherein the threshold time and/or distance to the determined geographic location at which said control informs the occupant is dependent on the speed of the equipped vehicle as the equipped vehicle travels along the route and approaches the determined geographical location.

* * * * *